(12) United States Patent
Brian

(10) Patent No.: US 11,129,367 B2
(45) Date of Patent: Sep. 28, 2021

(54) LEASH ATTACHMENT SYSTEM FOR DOG COLLAR OR HARNESS

(71) Applicant: Michael W. Brian, Lubbock, TX (US)

(72) Inventor: Michael W. Brian, Lubbock, TX (US)

(73) Assignee: Magdog, LLC, Lubbock (TK)

( * ) Notice: Subject to any disclaimer, the term of this patent is extended or adjusted under 35 U.S.C. 154(b) by 330 days.

(21) Appl. No.: 15/913,014

(22) Filed: Mar. 6, 2018

(65) Prior Publication Data

US 2018/0249682 A1 Sep. 6, 2018

Related U.S. Application Data

(60) Provisional application No. 62/467,657, filed on Mar. 6, 2017, provisional application No. 62/540,886, filed on Aug. 3, 2017.

(51) Int. Cl.
*A01K 27/00* (2006.01)

(52) U.S. Cl.
CPC .......... *A01K 27/005* (2013.01); *A01K 27/001* (2013.01); *A01K 27/003* (2013.01)

(58) Field of Classification Search
CPC .. A01K 27/005; A01K 27/001; A01K 27/003; A01K 27/002; A01K 27/004; A01K 27/006; A01K 27/007; A01K 27/008; A01K 27/009; Y10T 24/32
See application file for complete search history.

(56) References Cited

U.S. PATENT DOCUMENTS

| | | | | |
|---|---|---|---|---|
| 3,540,089 A * | 11/1970 | Franklin | ............... | A01K 27/005 24/602 |
| 5,103,771 A * | 4/1992 | Lee | ....................... | A01K 27/005 119/776 |
| 6,499,437 B1 * | 12/2002 | Sorensen | ............. | A01K 27/005 119/769 |
| 7,389,750 B1 * | 6/2008 | Rogers | ................. | A01K 27/005 119/792 |
| 8,142,053 B2 * | 3/2012 | Hurwitz | ................... | A44C 1/00 362/249.16 |
| 9,560,836 B2 | 2/2017 | DeBien | | |

(Continued)

OTHER PUBLICATIONS

Fidlock GmbH, Hannover Germany, HOOK, 20 Flat Sewable, http://www.fidlock.com/en/homepage/hook-family1.html; Mar. 1, 2017; http://www.fidlock.com/en/fasteners/snap.html; Mar. 1, 2017.

(Continued)

*Primary Examiner* — Trinh T Nguyen
(74) *Attorney, Agent, or Firm* — Loyal Intellectual Property Law, PLLC; Travis Banta

(57) ABSTRACT

A dog leash attachment system for selectively and releasably attaching a dog leash to a dog collar or harness, wherein the dog leash and the dog collar or dog harness each comprises a portion of a fastener device further comprising at least one magnetic attachment component and at least one mechanical attachment component. One portion of the fastener device is attached in fixed relation to the dog leash at a position proximal to the distal end of the dog leash. Another magnet is disclosed for use in maintaining a portion of the fastener device proximally to the collar or harness when the leash is not in use.

20 Claims, 3 Drawing Sheets

(56) References Cited

U.S. PATENT DOCUMENTS

| | | | | |
|---|---|---|---|---|
| 2004/0200435 A1* | 10/2004 | Debien | ............... | A01K 27/005 |
| | | | | 119/772 |
| 2006/0213455 A1* | 9/2006 | Bien | ................... | A01K 27/005 |
| | | | | 119/772 |
| 2015/0053145 A1* | 2/2015 | Miksovsky | ......... | A01K 27/003 |
| | | | | 119/772 |
| 2016/0235039 A1* | 8/2016 | Beal | ..................... | A01K 27/004 |
| 2016/0249589 A1* | 9/2016 | Soto | .................... | A01K 27/005 |
| | | | | 119/794 |

OTHER PUBLICATIONS

MagicLatch; MagicLatch Leash Connection System; http://magiclatch.com/; Mar. 1, 2017.

\* cited by examiner

LEASH ATTACHMENT SYSTEM FOR DOG COLLAR OR HARNESS

1. FIELD OF THE INVENTION

This invention relates to a dog leash attachment system for use with a dog collar or a dog harness. The dog leash attachment system desirably comprises a quick-release fastener device that further comprises two cooperatively configured, selectively attachable halves. One half of the subject fastener device is desirably attached in substantially fixed relation to a dog collar or dog harness, and the other half is desirably attached in substantially fixed relation to the leash. Each half of the dog leash attachment system desirably comprises a magnetic component and a mechanical component that are cooperatively configured and selectively engageable with the magnetic component and the mechanical component of the other half. The magnetic component of one half is desirably attracted to the magnetic component of the other half and facilitates rapid hook-up of the leash to the dog collar or dog harness, and the mechanical components strengthen the connection between the leash and the dog collar or dog harness to resist unintended separation during use.

Another aspect of the invention relates to a dog collar or a dog harness having a portion of a quick-release fastener device that further comprises a magnetic component and either the female or male portion of a mechanical component. The dog collar or dog harness is desirably used in combination with a dog leash having a distal end comprising an oppositely configured portion of the quick-release fastener device that is magnetically attracted to and selectively engageable with and disengageable from the portion attached to the dog collar or dog harness.

Still another aspect of the invention relates to a dog collar or harness each also having another magnetic component attracted to the magnetic component of the portion of the quick-release fastener device that is selectively engageable with and disengageable from the leash configured as above. Whenever a dog collar or dog harness is equipped with this additional magnetic component, the magnetic attraction between the two magnetic components of the dog collar or dog harness can prevent the free end of the disengaged portion of the quick-release fastener device from flopping around when detached from the leash. In some cases the additional magnetic component can increase the range of magnetic attraction between the dog collar or dog harness and the leash, depending upon the configuration and physical arrangement of the magnetic components used.

Still another aspect of the invention relates to a leash having one portion of a fastener device that is selectively and releasably attachable to a cooperatively configured portion of a fastener device attached to a dog collar or a dog harness and also having one portion of another similarly configured fastener device that is attachable to a portion of a cooperatively configured fastener device attached in fixed or releasable relation to another object such as, for example, a carrier for dog refuse bags.

2. DESCRIPTION OF RELATED ART

Many types of attachment devices are previously disclosed for use in releasably attaching one end of a dog leash to a dog collar or harness. Most use a snap ring or clasp that is attachable to a mounting ring disposed on a dog collar or harness. None is known to include the combination of elements embodied in the present invention.

Fidlock GmbH of Hannover, Germany has previously disclosed fastener technology that is said to be highly reliable, robust and secure. Some such fasteners use neodymium magnets combined with stable mechanical locking. One such fastener device is the Fidlock "Hook 20 flat sewable" fastener that integrates magnets and a hook in an extraordinary slim profile and boasts an extremely low fastener height. This product is said to be particularly suitable for applications that require slim fasteners, such as sports watches, clothing and other textile products and is attachable to webbing that can be sewn or otherwise attached in substantially fixed relation to a dog collar or dog harness. No prior use of such combination magnetic and mechanical fastener devices for connecting dog collars or dog harnesses to leashes is known.

SUMMARY OF THE INVENTION

In one embodiment of the invention, a dog leash attachment system is disclosed that comprises a fastener device with cooperating male and female portions each having in combination both a magnetic component and a mechanical component. One half of the fastener device is desirably sewn to or otherwise attached in substantially fixed relation to a dog collar or a dog harness in such manner that the attached portion is not dangling or obtrusive when the collar or harness is being worn by a dog without attachment to a dog leash. The dog leash attachment system of the invention desirably further comprises an oppositely and cooperatively configured second half of the fastener device that is attached in substantially fixed and cooperating relation at or near the distal end of a dog leash to facilitate rapid attachment of the dog leash to and release of the dog leash from the collar or harness. As used herein, the "distal end" of a dog leash refers to the end of the dog leash that is nearer to the dog, and the "proximal end" of a dog leash refers to the end of the dog leash that is held by a person controlling the dog. According to another embodiment of the invention, the half of the subject fastener device that is attachable to a dog collar or dog harness can be configured and disposed so that the magnetic component holds the mechanical component close to the dog collar or dog harness whenever a leash is not attached.

Similarly, in another embodiment of the invention, a dog leash attachment system is disclosed in which a male or female portion of a second combination magnetic and mechanical fastener device is desirably sewn or otherwise attached in substantially fixed relation to a dog leash in a position that is spaced apart from the distal end of the leash. The spaced apart portion of the second fastener device comprising both a magnetic component and a mechanical component is useful for attaching an auxiliary item such as, for example, a key ring, storage pouch or carrier for pet refuse bags to the dog leash, which auxiliary item is also desirably provided with an oppositely and cooperatively configured portion of a fastener device that is selectively and releasably attachable to the portion of the second fastener device attached to said dog leash.

The provision and use of a dog leash attachment system comprising a fastener device having two halves with a combination of magnetic and mechanical components affords the user the convenience of quick attachment of the cooperatively configured magnetic components and the strength and resistance to separation that is made possible by the cooperatively configured mechanical components.

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
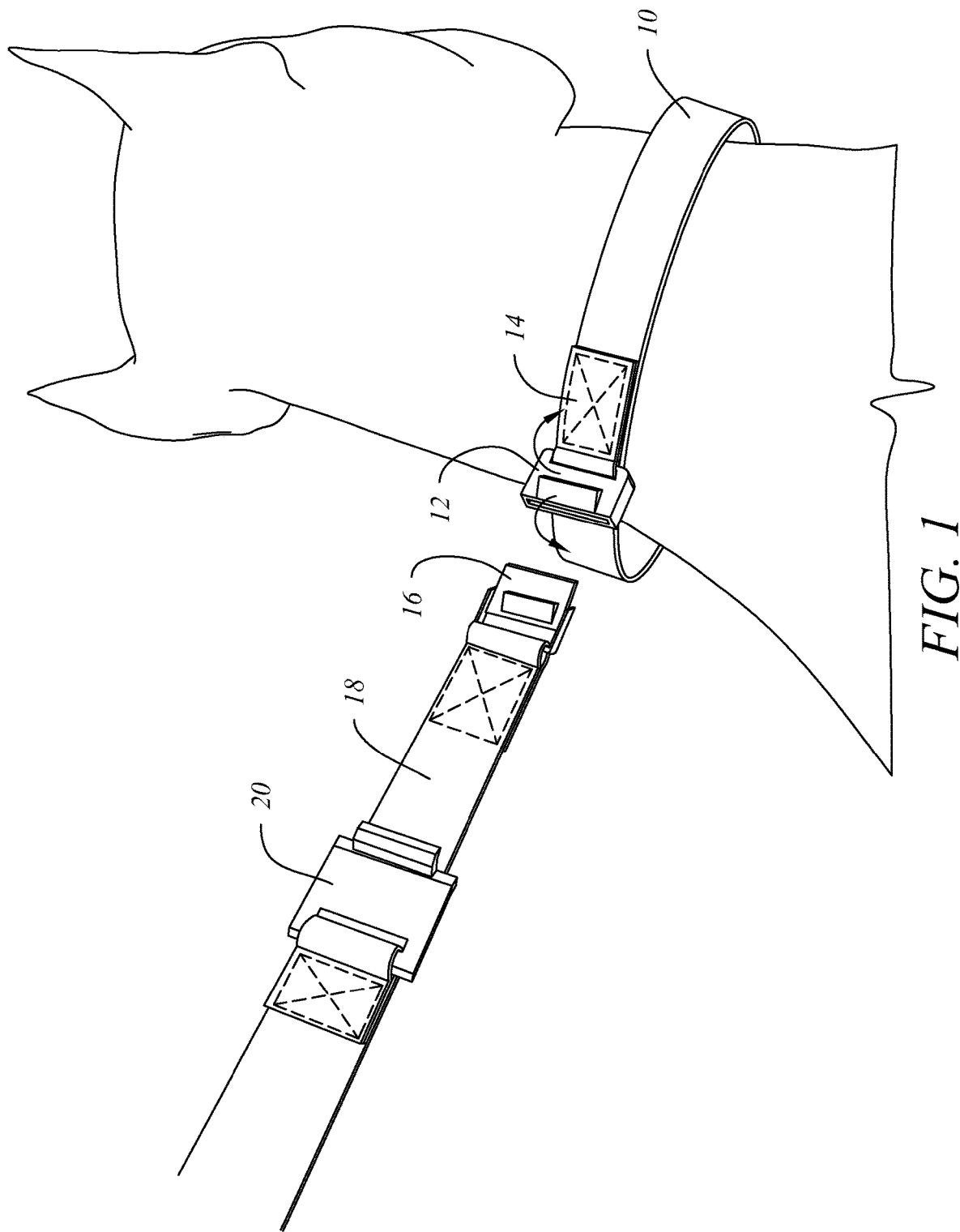
FIG. 1 is a perspective view of a collar made in accordance with one embodiment of the invention fastened around the neck of a dog and shown with the distal end portion of a leash made in accordance with one embodiment of the invention disposed in a position proximal to but not yet fastened to the collar.
Figure 2:
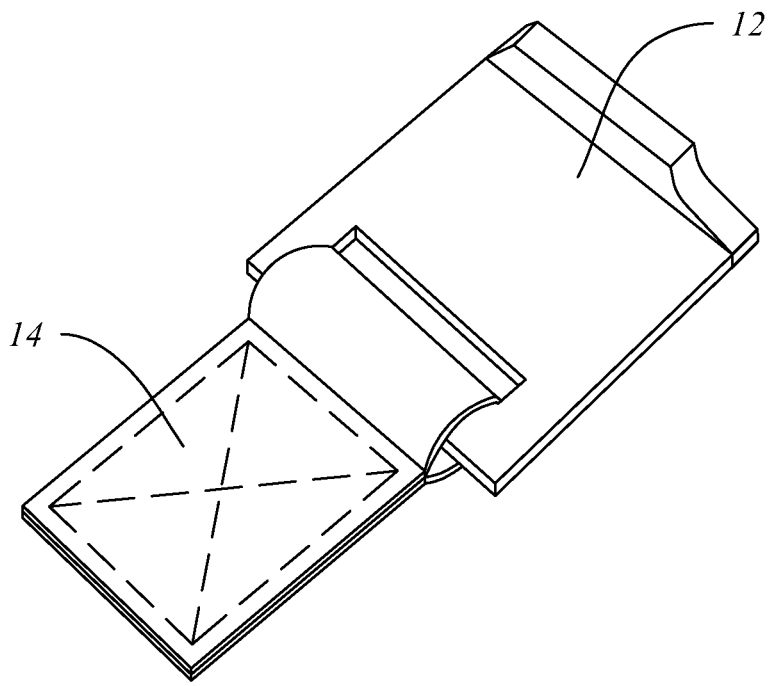
FIG. 2 is a perspective view of one half of a combination magnetic and mechanical fastener device suitable for use in one embodiment of the dog leash attachment system of the invention.
Figure 3:
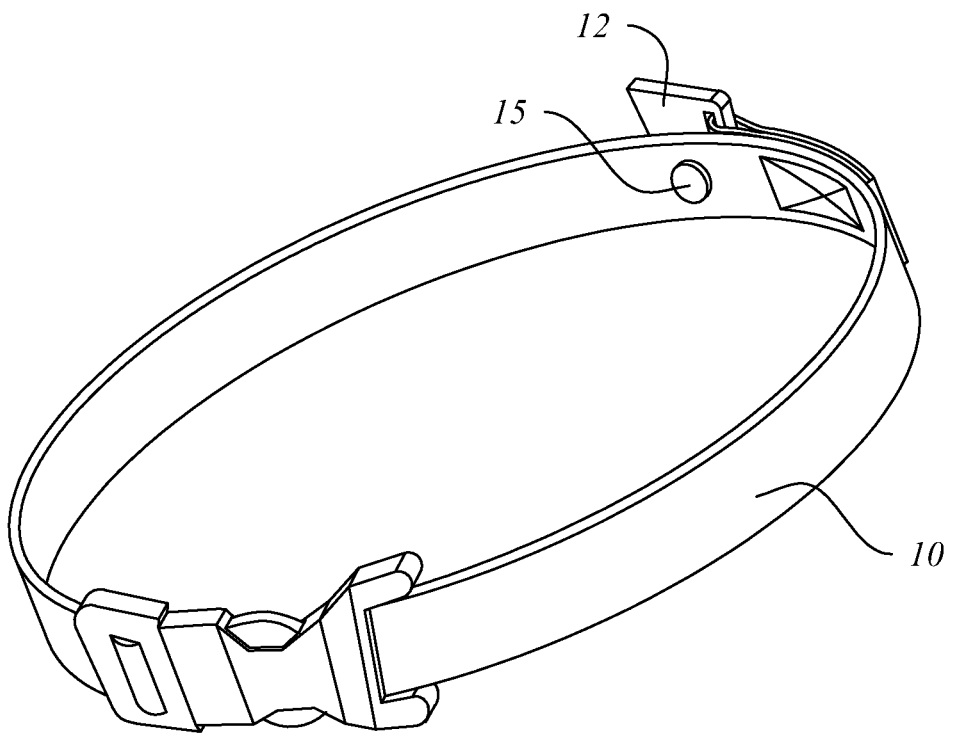
FIG. 3 is a perspective view of a dog collar equipped with one half of a combination magnetic and mechanical fastener device suitable for use in one embodiment of the dog leash attachment system of the invention and further comprising a magnetic component positioned to attract and hold the fastener component flat against the collar when not attached to a leash.

Referring to FIGS. 1 and 3, collar 10 is typically a conventional strap-type dog collar made of a material such as woven nylon and having a conventional "snap" buckle. The buckle is not visible in FIG. 1 but is shown in FIG. 3 and is approximately diametrically opposed to tab 14 (visible in FIGS. 1 and 2), which is desirably made of flexible webbing about 20 mm in width that is permanently sewn onto dog collar 10. As shown in FIGS. 1-3, tab 14 is desirably looped through a slot provided on one end of a female half 12 of a combination magnetic and mechanical fastener device that further comprises male half 16 as shown in FIG. 1. It will be appreciated in relation to FIG. 2 that female half 12 can be pivoted relative to tab 14 sewn to dog collar 10 unless somehow restrained either prior to or subsequent to attachment of female half 12 to leash 18 (FIG. 1). Male half 16 of the combination magnetic and mechanical fastener device also desirably comprises a fabric tab (like tab 14) of flexible webbing that is sewn onto the distal end of dog leash 18, the proximal (handle or hand loop) end of which is unnecessary to disclosure of the invention and is broken away for illustrative purposes.

Female half 12 and male half 16 of the fastener device each desirably comprises a magnetic component that is preferably a rare earth magnet configured and disposed so that halves 12 and 16 are magnetically attracted to each other with sufficient holding force to assist in bringing them together during the process of attaching dog leash 18 to dog collar 10. This magnetic attraction facilitates positioning and temporarily holding halves 12 and 16 so that the respective male and female portions of halves 16 and 12 can be mechanically engaged by the use of cooperatively disposed engagement tabs to provide a mechanical interlock that is stronger than the magnetic attraction between halves 16, 12 and that resists physical separation of halves 16, 12 for so long as any strain is exerted axially along leash 18 by the dog. At a later time when the user decides to disconnect leash 18 from dog collar 10, the mechanical coupling is quickly releasable by rotating male half 16 relative to female half 12 of the combination magnetic and mechanical fastener device to a position where only the magnetic attraction between male and female halves 16, 12 is holding them together. This remaining holding force is then easily overcome when the user manually pulls the distal end of dog leach 18 away from dog collar 10. One satisfactory fastener device suitable for use in making the dog leash attachment system of the invention is a commercially available "Fidlock 20" brand combination fastener device having magnetic and mechanical holding components and also having flexible tabs of fabric or webbing that can be sewn to a dog leash 18 or dog collar as seen in FIGS. 1-3. It will be appreciated, however, that other similarly effective devices functioning substantially as described above can also be used in making the dog leash attachment system of the invention.

Referring again to FIG. 1, leash 18 also optionally comprises another female half 20 of another combination magnetic and mechanical fastener device of the invention that is sewn onto leash 18. Female half 20 is provided for use in selectively and releasably attaching to dog leash 18 another auxiliary component such as, for example, a key ring, a carrier for pet waste refuse bags, or a storage pouch for miscellaneous other items that each comprise a cooperatively configured half of a combination fastener device having magnetic and mechanical components as discussed above.

Referring again to FIG. 3, another magnetic component 15 can be attached to dog collar 10 if desired to hold female half 12 of the combination fastener device against the underlying outside surface of dog collar 10 whenever female half 12 is not attached to male half 12 that is attached to dog collar 10. Magnet 15 is desirably permanently secured to collar 10, and can be attached to either surface or disposed inside a pocket in the material of dog collar 10 as desired. A principal benefit of using magnet 15 is that it keeps female half 12 of the collar from flopping around when leash 18 isn't attached.

Figure 4:
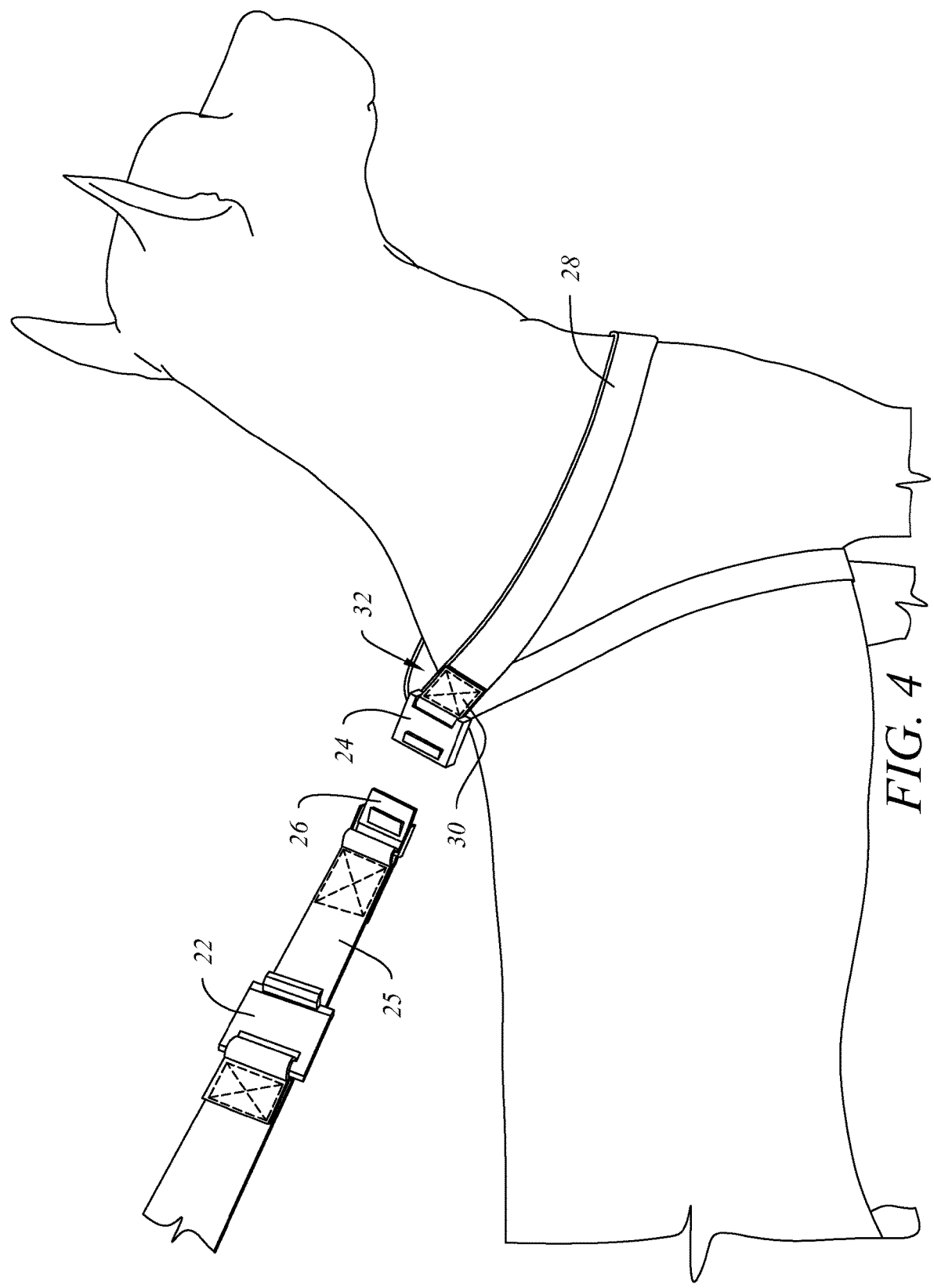
FIG. 4 a perspective view as in FIG. 1 except that a dog harness is substituted for the dog collar.

Referring to FIG. 4, another female half 24 of a fastener device 32 is disclosed in relation to dog harness 28, with tab 30 being sewn onto one strap of the harness. As with the embodiment disclosed in relation to FIGS. 1-3, male half 26 of the associated combination magnetic and mechanical fastener device is permanently attached, again by sewing in this embodiment, to the distal end of dog leash 25, and female half 22 for use with an auxiliary component is shown attached to dog leash 25 in a position that is spaced apart from male half 26.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor and/or Applicant are legally entitled.

What is claimed is:

1. A dog leash attachment system for selectively and releasably attaching a dog leash to a dog collar, the system comprising;
    a dog leash further comprising a distal end and a first portion of a fastener device permanently attached to the dog leash near the distal end by a loop at the distal end of the dog leash which is disposed through a corresponding slot in the first portion of the fastener device, the first portion of the fastener device further comprising at least one magnetic attachment component and a first engagement tab disposed on the first portion of the fastener device; and
    a dog collar further comprising and a second portion of a fastener device, the second portion of the fastener device being attached to the dog collar by a loop positioned through a slot in the second portion of the second fastener device and attached to the dog collar, the second portion of the fastener device further comprising at least one magnetic attachment component and a second engagement tab disposed on the second portion of the fastener device, wherein the first engagement tab on the first portion of the fastener device and the second engagement tab disposed on the second portion of the fastener device engage with each other when the at least one magnetic attachment on the first portion of the fastener device and the at least one magnetic attachment on the second portion of the fastener device magnetically connect and wherein the dog collar further comprises an additional magnetic component magnetically attached to the second portion of the fastener device when the dog leash is not attached to the second portion of the fastener device to hold the second portion of the fastener device proximally to the dog collar.

2. The dog leash attachment system of claim 1, wherein the first portion and the second portion are cooperatively configured to magnetically connect when cooperatively aligned in proximal relation to each other.

3. The dog leash attachment system of claim 1, wherein the engagement between the first engagement tab and the second engagement tab provides a greater holding force than the magnetic attachment between the first portion of the fastener device and the second portion of the fastener device when the dog leash is subjected to a pulling force between a dog and a user.

4. The dog leash attachment system of claim 1, further comprising part of an additional fastener device further comprising in combination at least one magnetic attachment component and at least one mechanical attachment component for use in attaching an auxiliary component to the dog leash.

5. The dog leash attachment system of claim 1, wherein the additional magnetic component of the dog collar is positioned such that when the leash is removed from the second portion of the fastener device the second portion of the fastener device is drawn by at least the magnetic force to attach to the additional magnetic component.

6. The dog leash attachment system of claim 1, wherein the dog leash further comprises a buckle.

7. A dog leash attachment system for selectively and releasably attaching a dog leash to a dog harness, the system comprising;

a dog leash further comprising a distal end and a first portion of a fastener device permanently attached to the dog leash near the distal end by a loop at the distal end of the dog leash which is disposed through a corresponding slot in the first portion of the fastener device, the first portion of the fastener device further comprising at least one magnetic attachment component and a first engagement tab disposed on the first portion of the fastener device and at least one mechanical attachment component;

a dog harness further comprising a second portion of a fastener device, the second portion of the fastener device being attached to the dog harness by a loop positioned through a slot in the second portion of the second fastener device and attached to the dog harness, the second portion of the fastener device further comprising at least one magnetic attachment component and a second engagement tab disposed on the second portion of the fastener device, wherein the first engagement tab on the first portion of the fastener device and the second engagement tab disposed on the second portion of the fastener device engage with each other when the at least one magnetic attachment on the first portion of the fastener device and the at least one magnetic attachment on the second portion of the fastener device magnetically connect; and wherein the dog harness further comprises an additional magnetic component magnetically attached to the second portion of the fastener device when the dog leash is not attached to the second portion of the fastener device to hold the second portion of the fastener device proximally to the dog harness.

8. The dog leash attachment system of claim 7, wherein the first portion and the second portion are cooperatively configured to magnetically connect when cooperatively aligned in proximal relation to each other.

9. The dog leash attachment system of claim 7, wherein the engagement between the first engagement tab and the second engagement tab provides a greater holding force than the magnetic attachment between the first portion of the fastener device and the second portion of the fastener device when the dog leash is subjected to a pulling force between a dog and a user.

10. The dog leash attachment system of claim 7, further comprising part of an additional fastener device further comprising in combination at least one magnetic attachment component and at least one mechanical attachment component for use in attaching an auxiliary component to the dog leash.

11. The dog leash attachment system of claim 7, wherein the magnetic component of the dog harness is positioned such that the second portion of the fastener device is drawn by at least the magnetic force to attach to the additional magnetic component when the dog leash is not attached to the second portion of the fastener device.

12. The dog leash attachment system of claim 7, wherein the dog leash further comprises a buckle.

13. A system, comprising:

a fastener device including a first portion and a second portion, the first portion including an engagement tab and a magnet and the second portion including an engagement tab and a magnet;

a dog leash including a first portion of the fastener device permanently attached at a distal end of the dog leash by a loop at the distal end of the dog leash which is disposed through a corresponding slot in the first portion of the fastener device;

one of a dog collar or dog harness including a second portion of the fastener device connected to one of the dog collar or dog harness by a loop positioned through a slot in the second portion of the fastener device and attached to the one of the dog collar or dog harness, wherein the first engagement tab and the second engagement tab engage with each other to form a mechanical connection between the first portion and the second portion when the magnet in the first portion and the magnet in the second portion magnetically connect; and wherein one of the dog collar or the dog harness further comprises an additional magnetic component magnetically attached to the second portion of the fastener device when the dog leash is not attached to the second portion of the fastener device to hold the second portion of the fastener device proximally to one of the dog collar or dog harness.

14. The system of claim 13, wherein the fastener device includes a tab for disengaging the first engagement tab from the second engagement tab.

15. The system of claim 13, wherein the dog leash further includes a flexible tab providing a mechanical hold on the fastener device.

16. The system of claim 15, wherein the flexible tab is sewn on the dog leash.

17. The system of claim 16, wherein the flexible tab is a fabric tab or a webbing tab.

18. The system of claim 13, wherein the first portion is a male portion and the second portion is a female portion.

19. The system of claim 13, wherein first engagement tab and the second engagement tab resist axial pressure applied to the leash through the one of the dog collar or dog harness.

20. The system of claim 13, wherein the first portion is pivotable at the distal end of the dog leash.

* * * * *